United States Patent
Davidsson

(10) Patent No.: US 7,204,170 B2
(45) Date of Patent: Apr. 17, 2007

(54) DEVICE FOR TRANSMITTING TORQUE BETWEEN TWO ROTATABLE, COAXIAL SHAFT MEMBERS

(75) Inventor: Per-Olof Davidsson, Limhamn (SE)

(73) Assignee: Haldex Traction AB (SE)

(*) Notice: Subject to any disclaimer, the term of this patent is extended or adjusted under 35 U.S.C. 154(b) by 0 days.

(21) Appl. No.: 11/281,023

(22) Filed: Nov. 17, 2005

(65) Prior Publication Data

US 2006/0065069 A1    Mar. 30, 2006

Related U.S. Application Data

(62) Division of application No. 10/730,581, filed on Dec. 8, 2003.

(30) Foreign Application Priority Data

Dec. 6, 2002    (SE) .................................. 0203618

(51) Int. Cl.
F16H 48/12    (2006.01)

(52) U.S. Cl. .................. 74/650; 192/54.3; 192/59; 192/85 R; 192/103 F

(58) Field of Classification Search .................. 74/650; 192/103 F, 85 AA, 85 CA, 85 R, 59, 57, 192/54.3
See application file for complete search history.

(56) References Cited

U.S. PATENT DOCUMENTS

| | | | |
|---|---|---|---|
| 5,111,716 A | 5/1992 | Sato et al. .................. 74/733.1 |
| 5,201,820 A | 4/1993 | Hamada et al. ............. 180/233 |
| 5,469,950 A * | 11/1995 | Lundstrom et al. ........... 192/86 |
| 5,687,824 A | 11/1997 | Hara et al. ............... 192/85 CA |
| 5,967,285 A | 10/1999 | Mohan et al. ........... 192/103 F |
| 5,979,631 A | 11/1999 | Lundstrom ............. 192/85 CA |
| 6,315,097 B1 | 11/2001 | Burns .......................... 192/35 |
| 6,454,068 B2 * | 9/2002 | Arai et al. ..................... 192/35 |
| 6,578,692 B2 | 6/2003 | Porter .................... 192/103 F |
| 6,789,658 B2 | 9/2004 | Busold et al. ........... 192/103 F |
| 2001/0035323 A1* | 11/2001 | Porter ......................... 192/35 |

FOREIGN PATENT DOCUMENTS

WO    WO 97/04245    2/1997

* cited by examiner

Primary Examiner—David D. Le
(74) Attorney, Agent, or Firm—St. Onge Steward Johnston & Reens LLC

(57) ABSTRACT

A device for transmitting torque between two rotatable, coaxial shaft members contains a clutch between the two shaft members and engageable to counteract rotational speed differential between the shaft members by a hydraulic piston under the control of an electrically controlled throttle or pressure valve, and a clutch pump for supplying hydraulic pressure to the hydraulic piston, the clutch pump being driven by either one or both of the shaft members. The hydraulic piston, the valve, and the clutch pump are connected in a hydraulic system also containing a feeder pump for maintaining a certain base pressure in the system. The hydraulic system conditionally allows flow from the feeder pump past the valve to the hydraulic piston irrespective of the flow from the clutch pump.

5 Claims, 5 Drawing Sheets

DEVICE FOR TRANSMITTING TORQUE BETWEEN TWO ROTATABLE, COAXIAL SHAFT MEMBERS

PRIOR APPLICATIONS

This is a divisional application of United States Patent Application No. U.S. patent application Ser. No. 10/730,581, filed Dec. 8, 2003, entitled "A Device For Transmitting Torque Between Two Rotatable, Coaxial Shaft Members;" which claims priority to Swedish Patent Application No. 0203618-4 filed Dec. 6, 2002.

FIELD OF THE INVENTION

The present invention relates to a device for transmitting torque between two rotatable, coaxial shaft members, the device containing a clutch between the two shaft members and engageable—to counteract rotational speed differential between the shaft members—by means of a hydraulic piston under the control of an electrically controlled throttle or pressure valve, and a clutch pump for supplying hydraulic pressure to the hydraulic piston, the clutch pump being driven by either one or both of the shaft members, wherein the hydraulic piston, the valve, and the clutch pump are connected in a hydraulic system also containing a feeder pump for maintaining a certain base pressure in the system.

The invention especially relates to such a device, wherein the clutch pump is a differential pump driven by the rotational speed differential between the two shaft members. Reference is below only made to such a differential pump.

BACKGROUND OF THE INVENTION

A practical device of this kind is used as a so called "limited slip coupling" in a four-wheel-driven car for transmitting force for example from the driving forward axle of the car to its driven rear axle. In such a case, the coupling is arranged in the longitudinal drive shaft between the forward and rear axles.

The coupling is based on the principle that when there is a rotational speed differential between the two shaft members in the coupling, the differential pump will create a hydraulic flow which—moderated by the electrically controlled valve—will be transmitted to the clutch for counteracting the rotational speed differential.

A typical example of such a limited slip coupling is shown in WO 97/04245, to which reference is made for further information.

A possible drawback with the coupling shown therein and referred to above is that it may in certain cases be desirable to transmit a certain moment already when the vehicle or car stands still—a so called "lockup from stationary". As the design so far described is dependent for its function on a certain rotational speed differential this is not possible.

The main object of the invention is thus to modify the device or coupling as so far described to enable a "lockup from stationary".

SUMMARY OF THE INVENTION

This may according to the invention be attained by means in the hydraulic system for conditionally allowing flow from the feeder pump past the valve to the hydraulic piston irrespective of the flow from the differential pump.

The inventive idea is accordingly to make use of the flow from the feeder pump, which is available for the purpose of maintaining a certain base pressure in the hydraulic system required for the ordinary function of the device.

In a practical case—as is shown in WO 97/04245—the hydraulic system—in a closed portion—comprises lines from the differential pump, through the electrically controlled throttle or pressure valve to the clutch, the portion including check-valves. However, oil may be supplied by the feeder pump from a reservoir and may be removed or returned to the reservoir via an overflow valve.

In such a system the feeder pump and the differential pump may in accordance with the invention either be connected in series or in parallel in order to fulfill the purpose of conditionally (i.e. through the electrically controlled throttle or pressure valve) using the feeder pump flow for actuating the clutch.

In an arrangement for series connection a separate check-valve is arranged between the overflow valve and the feeder pump.

Here, an accumulator may be arranged either in connection with the overflow valve or the feeder pump.

In an arrangement for parallel connection a separate check-valve is arranged between the feeder pump and the electrically controlled throttle or pressure valve.

In order to prevent return flow, when the fluid pressure exceeds that of the feeder pump, a separate overflow valve may be connected in parallel over the check-valve in all the embodiments described above.

BRIEF DESCRIPTION OF THE DRAWINGS

The invention will be described in further detail below under reference to the accompanying drawings, in which.

DETAILED DESCRIPTION OF EMBODIMENTS

The present invention is concerned with a hydraulic system for a so called limited slip coupling of the type usually used to transmit torque from a first driven axle of a four-wheel drive road vehicle to a second driven axle, or differently speaking for transmitting torque between two rotatable, coaxial shaft members.

Such a limited slip coupling is for example known through WO 97/04245, to which reference is made. The design of this coupling is also shown and described here for providing a proper understanding of the hydraulic system according to the invention. This description is kept as short as possible.

Figure 1:
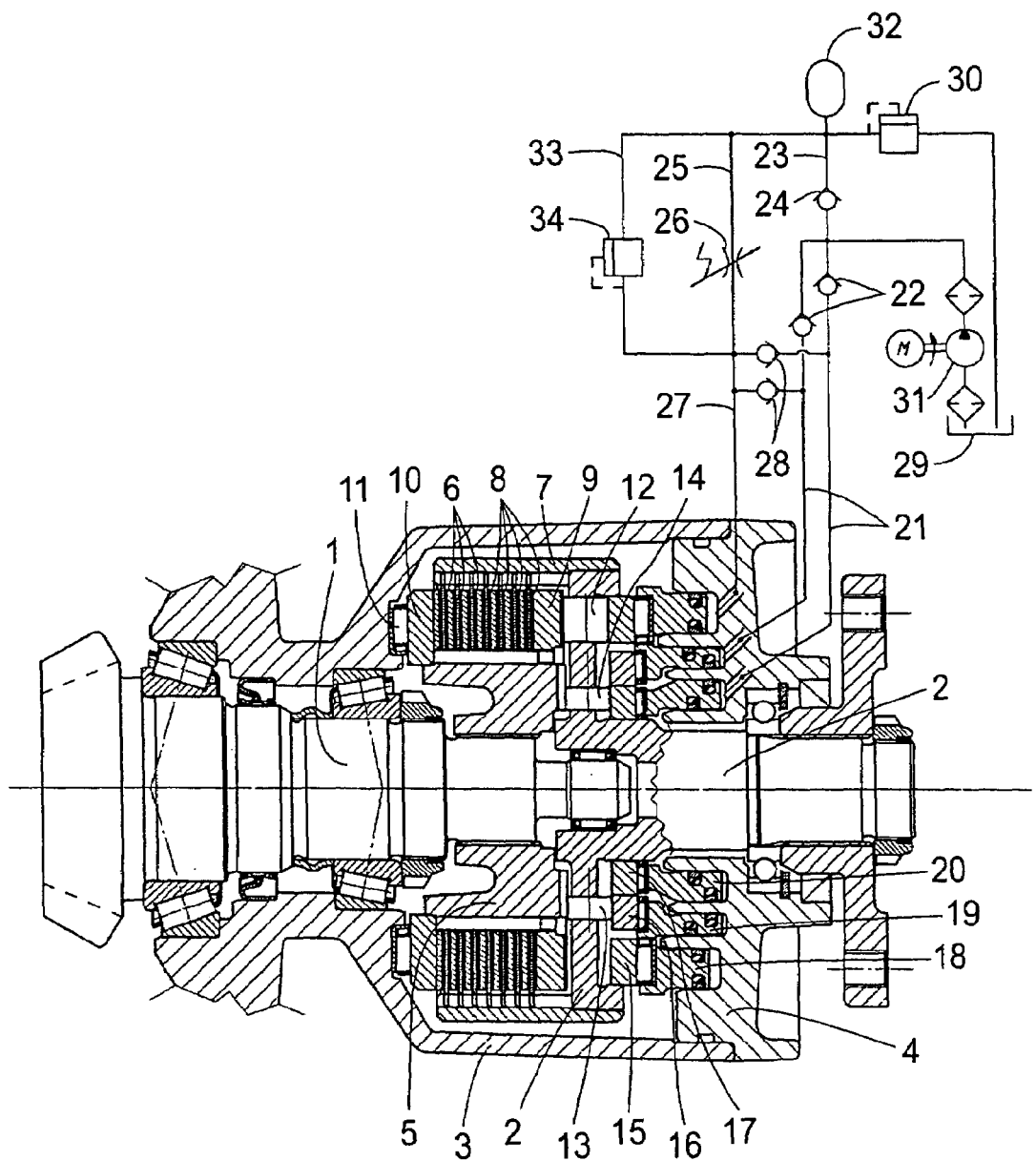
FIG. 1 is a sectional view of a prior art limited slip coupling with a first embodiment of a hydraulic system according to the invention, FIGS. 2–4 diagrammatically show other embodiments of hydraulic systems according to the invention, and FIGS. 5–10 diagrammatically and in a different fashion show the different embodiments of a hydraulic system shown in FIGS. 1–4.

A first shaft 1 to the left in FIG. 1 and a second shaft 2 to the right are rotatably journalled in a housing 3 with a cover 4.

A hub 5 is attached to the first shaft 1 and constitutes a first shaft member therewith.

A number of alternate clutch discs or rings 6 are externally splined to the hub 5.

The second shaft 2 has a radial flange 2', and a sleeve 7 is attached thereto. The shaft 2 with its flange 2' and the sleeve 7 together constitute a second shaft member.

A number of alternate clutch discs or rings 8 corresponding to the clutch discs 6 are internally splined to the sleeve 7. When engaged, the clutch discs 6 and 8 will counteract rotational speed differential between the two shaft members.

A cam disc 9 is splined to the hub 5 to the right of the clutch discs 6, 8 in the drawing for their engagement in a way to be described, and the reaction force is taken up by the housing 3 via a thrust washer 10, which is positioned to the left of the clutch discs 6, 8 in the drawing, and an axial needle bearing 11, supported by the housing 3.

At its surface facing from the clutch discs 6, 8 the cam disc 9 is provided with a circular cam curve, and the axial end surface of the hub 5 is provided with a corresponding circular cam curve. Three sets of cylindrical cam rollers 12–14 are arranged to cooperate with these cam curves. The cam rollers 12–14 are rotatably arranged in the radial flange 2' of the second shaft 2. Each set may contain for example three cam rollers, and there is a phase shift from one set to the next one, for example amounting to 30°. The cam profile on the cam disc 9 is such that at rotation the cam rollers 12–14 will be imparted a movement whose axial speed is linearly changed with the relative rotational angle between the shafts 1 and 2.

Thrust washers 15–17 are in engagement with the cam rollers 12–14. These thrust washers 15–17 are concentrical and rotatable independently of each other.

Three concentrical, ring-shaped pistons 18–20 are axially movable in corresponding ring-shaped cylinders in the housing cover 4 and are provided with sealings. The two inner pistons 19, 20 cooperating with the hub 5 have the same piston area, whereas the outermost piston 18 cooperating with the cam disc 9 has a greater area.

The result of the described arrangement is that the pistons 18–20 will be imparted axially reciprocating movements, when the two shafts 1 and 2 have a rotational speed differential.

A hydraulic line 21 provided with a check valve 22 is connected to each of the two ring-shaped cylinders for the inner pistons 19, 20. After the check valves 22 the two lines 21 are connected to each other and lead to an overflow line 23 (here shown to be provided with a check valve 24 to be described below in connection with the invention), and further to a hydraulic line 25 provided with an electrically controlled throttle valve 26. The hydraulic line 25 is connected to the ring-shaped cylinder for the outermost piston 18 by a hydraulic line 27. This latter line 27 is connected to the hydraulic lines 21 via check valves 28. This hydraulic system is a closed system.

The hydraulic line 23 is also connected to an oil reservoir 29 via an overflow valve 30, for example adjusted to a pressure of 3 bar. Oil from the reservoir 29 is pumped by means of a motor-driven pump 31 to the hydraulic lines 21. The main purpose of the pump 31, which below is called a feeder pump, is to establish a certain working pressure in the closed hydraulic system. The system will not be able to function as intended without this system pressure.

An accumulator 32 is connected to the hydraulic system (at the hydraulic line 23) for leveling out variations in the flow to the pistons 18–20.

The purpose of the electrically controlled throttle valve 26 is to control the working pressure in the closed hydraulic system and thus to control the force with which the rotational speed differential will be counteracted.

For the sake of clarity, the hydraulic system is shown as being arranged outside the housing 3, 4. In reality it is arranged within the housing, which in itself functions as the reservoir 29.

When the described hydraulic system is under pressure, so that the pistons 18–20 are held against the thrust washers 15–17, a rotational speed differential between the two shafts 1 and 2 will effect a reciprocal movement of the pistons 18–20, as the cam rollers 12–14 roll on their respective cam curves. The frequency of the reciprocal movements increases with increasing rotational speed differential.

For a further description of the device and its function reference is made to WO 97/04245.

The main constituents of the device are a "differential pump", namely the hydraulic pump creating a hydraulic flow depending on the rotational speed differential between the two shafts, a "clutch", namely the hydraulic piston for actuating the clutch discs and accomplishing a torque transmission between the two shafts, when the flow passes the electrically controlled throttle valve, and a "feeder pump" with an overflow valve for maintaining a certain base pressure in the otherwise closed system.

A certain rotational speed differential is needed for building up the hydraulic pressure required for actuating the clutch. This will prevent a so called "lockup from stationary", i e an actuation of the clutch for enabling the transmission of torque between the two shafts, when the vehicle (in which the device is arranged) is stationary.

The present invention is aimed at enabling a "lockup from stationary" in a device of the general kind described above.

Generally speaking, this may be accomplished by utilizing the feeder pump for supplying the necessary hydraulic pressure to the piston for actuating the clutch, even if the differential pump can not deliver any pressure, as the vehicle is stationary.

In a first embodiment as shown in FIG. 1 this is accomplished by the provision of the above-mentioned check valve 24 in the hydraulic line 23 and of a hydraulic line 33, which contains an overflow valve 34 and is parallel to the hydraulic line containing the throttle valve 26.

Figure 5:
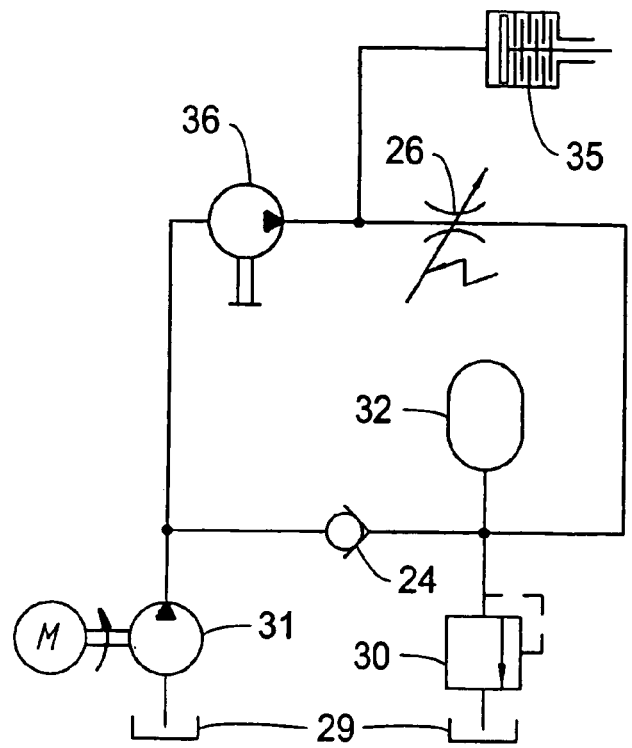

This first embodiment is also illustrated by the hydraulic scheme in FIG. 5.

The reference numeral 35 is used for the "clutch", namely to collectively indicate the hydraulic piston 18 actuating the clutch discs 6 and 8 connecting the two shafts 1 and 2. The reference numeral 36 refers to the "differential pump" including the pistons 19 and 20 and adjoining members and the check valves 22 and 28.

Also shown in FIG. 5 are the check valve 24, the throttle valve 26 (which alternatively could be an electrically controllable pressure valve), the reservoir 29, the overflow valve (or relief valve) 30, typically set at a pressure of 3–5 bar, the feeder pump 31, and the accumulator 32.

The feeder pump 31 establishes a hydraulic pressure in the accumulator 32 (through the throttle valve 26) and will provide a increased pressure in the clutch, when the rotational speed differential is nil and the throttle valve 26 is partly or fully closed.

It appears that the feeder pump 31 and the differential pump 36 are connected in series before the throttle valve 26. The check valve 24 is situated between on one hand the feeder pump 31 and on the other hand the accumulator 32 and the overflow valve 30.

In FIGS. 2–10 only reference numerals needed for a proper understanding are used. All other numerals appear in FIG. 1.

Figure 2:
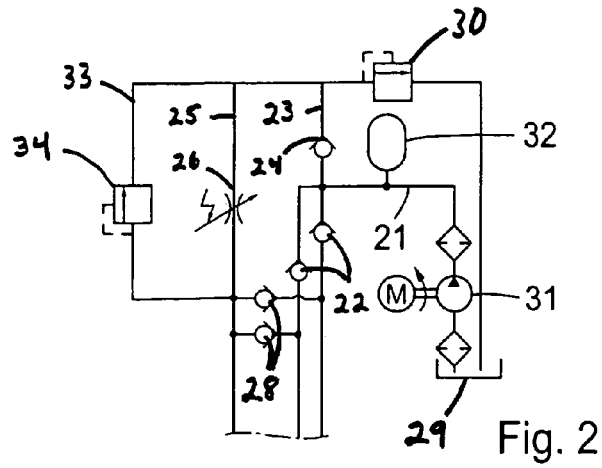
Figure 6:
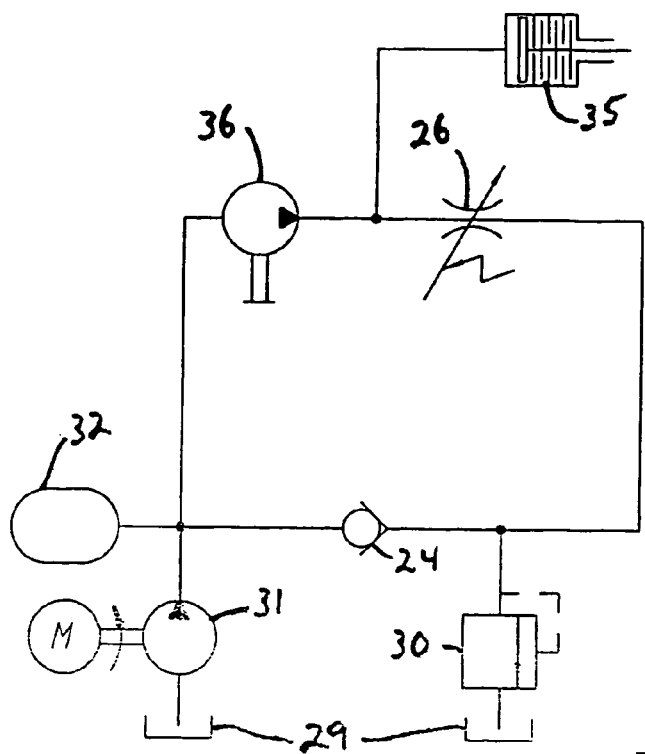

A second embodiment is shown in FIGS. 2 and 6. The only difference in relation to the first embodiment is the position of the accumulator 32, which here is connected to the hydraulic line 21 to the feeder pump 31.

This means that the feeder pump 31 and the differential pump 36 are again connected in series, but that the feeder pump 31 and the accumulator 32 are at the same side of the throttle valve 26.

Figure 3:
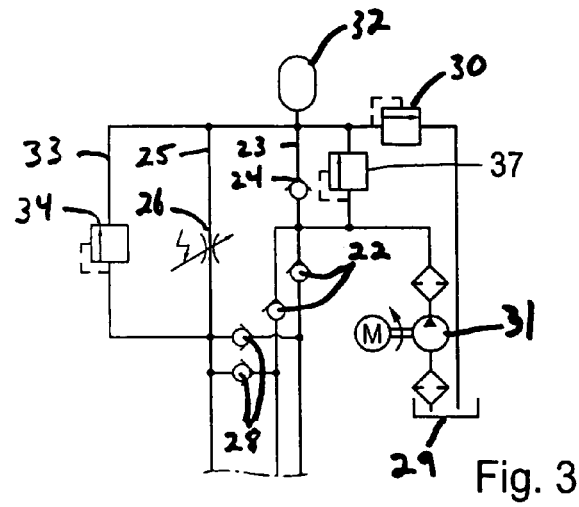
Figure 7:
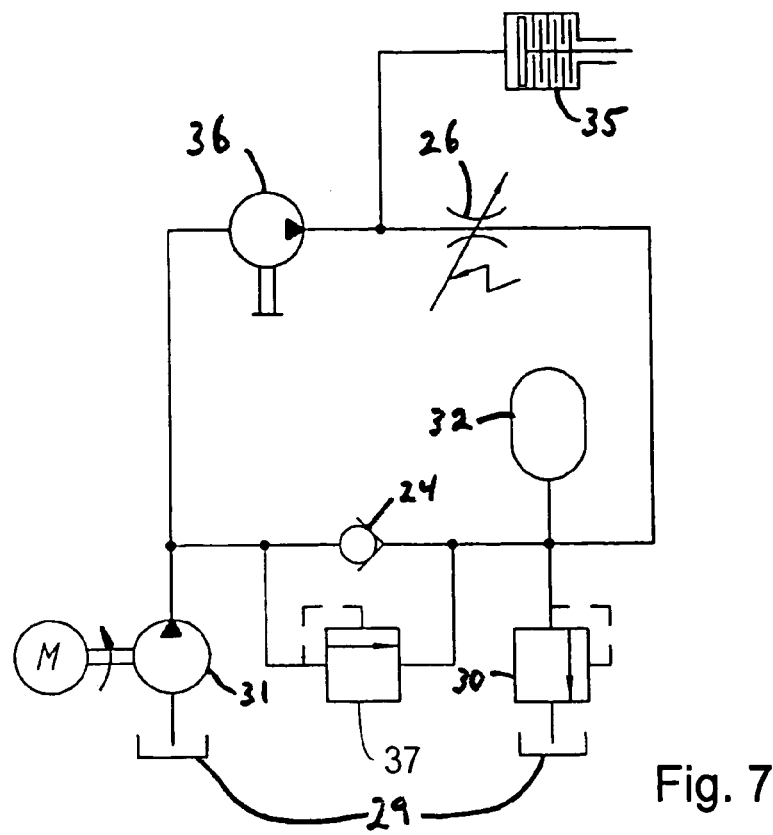

A third embodiment is shown in FIGS. 3 and 7. The difference in relation to the first embodiment is that a further overflow valve 37 is connected in parallel with the check valve 24. Hereby the maximum pressure from the feeder pump 31 will be limited.

Figure 4:
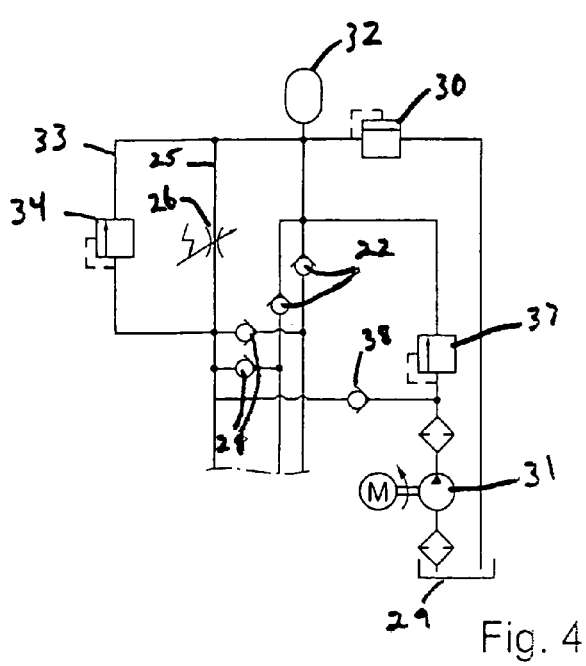
Figure 8:
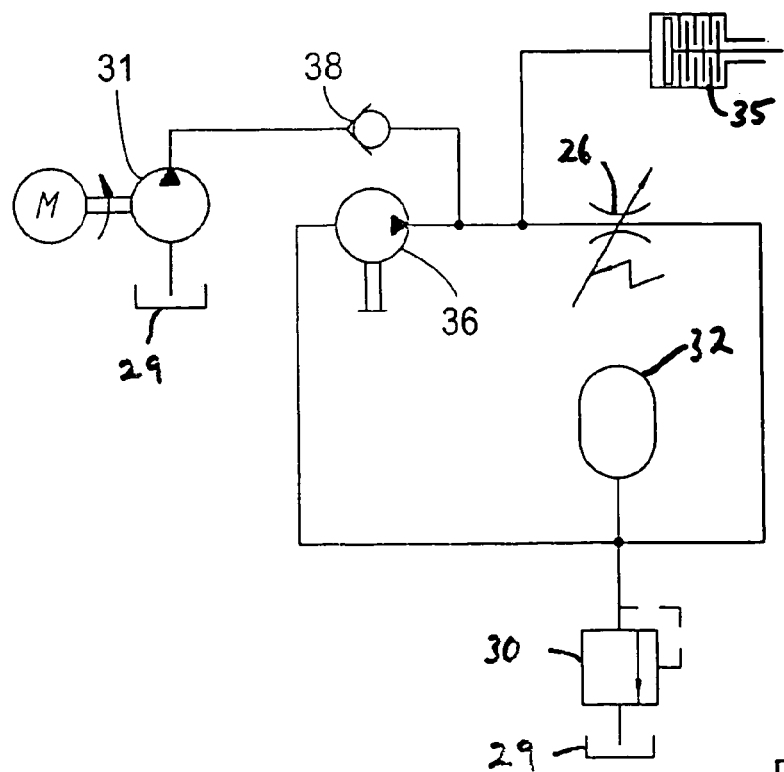

A fourth embodiment is shown in FIG. 8 (and FIG. 4, as will appear). The basic thought behind the fourth embodiment is to arrange the feeder pump 31 and the differential pump 36 in parallel before the throttle valve 26. A check valve 38 in the hydraulic line from the feeder pump 31 will prevent back-flow to the feeder pump 31, if the differential pump 36 is "stronger".

Figure 9:
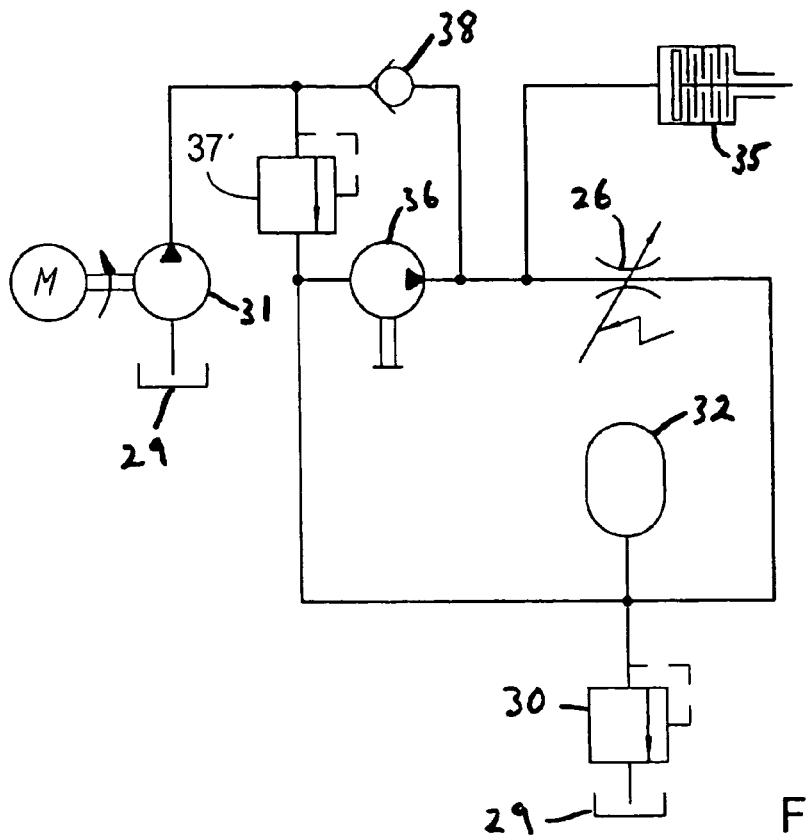

A variation, being in effect a combination of the third and fourth embodiments, is shown in FIG. 9, where the overflow valve has received the numeral 37'.

A detailed hydraulic scheme for a combination of the third and fourth embodiments is also shown in FIG. 4.

Figure 10:
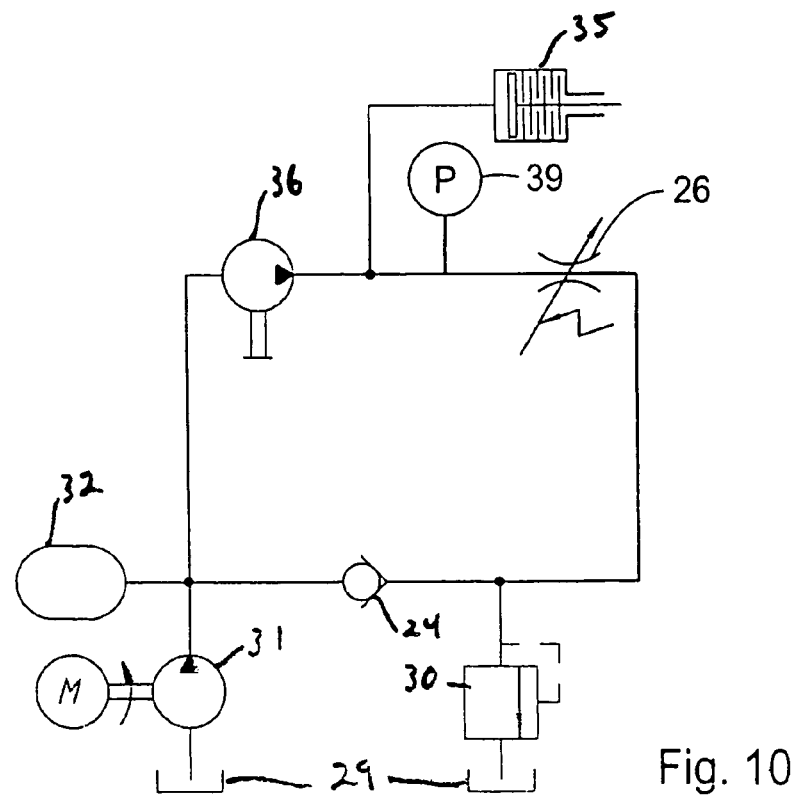

A fifth embodiment is shown in FIG. 10, which is illustrated as a variation of FIG. 5 (the first embodiment). In this embodiment the throttle valve 26 is combined with a pressure transducer 39. By the provision of this pressure transducer 39 it will be possible to lock the clutch at a certain pressure at the rotational speed differential nil, then to intermittently operate the feeder pump at high power and thereafter to decrease the power for i.e. a saving the pump motor. This embodiment can be combined with all the other embodiments.

What is claimed is:

1. A device for transmitting torque between two rotatable, coaxial shaft members, the device containing:
   a clutch between the two shaft members and engageable—to counteract rotational speed differential between the shaft members—by means of a hydraulic piston under the control of an electrically controlled throttle or pressure valve;
   a clutch pump for supplying hydraulic pressure to the hydraulic piston;
   wherein the hydraulic piston, the valve, and the clutch pump are connected in a hydraulic system also containing a feeder pump for maintaining a certain base pressure in the system;
   characterized by means in the hydraulic system for conditionally allowing flow from the feeder pump past the valve and to the hydraulic piston irrespective of the flow from the clutch pump;
   wherein the clutch pump is a differential pump driven by the rotational speed differential between the two shaft members;
   in which the hydraulic system in a closed portion comprises lines from the differential pump, through the electrically controlled throttle or pressure valve to the clutch, the portion including check-valves, and in which oil may be supplied by the feeder pump from a reservoir and may be removed to the reservoir via an overflow valve; and
   wherein the feeder pump and the differential pump are connected in series by means of a check-valve between the overflow valve and the feeder pump.

2. A device according to claim 1, wherein an accumulator is arranged in connection with the overflow valve.

3. A device according to claim 1, wherein an accumulator is arranged in connection with the feeder pump.

4. A device according to claim 1, wherein a pressure transducer is arranged in conjunction with the electrically controlled throttle or pressure valve.

5. A device for transmitting torque between two rotatable, coaxial shaft members, the device containing:
   a clutch between the two shaft members and engageable to counteract rotational speed differential between the shaft members by means of a hydraulic piston under the control of an electrically controlled throttle or pressure valve;
   a clutch pump for supplying hydraulic pressure to the hydraulic piston, the clutch pump being driven by either one or both of the shaft members;
   wherein the hydraulic piston, the valve, and the clutch pump are connected in a hydraulic system also containing a feeder pump for maintaining a certain base pressure in the system;
   characterized by means in the hydraulic system for conditionally allowing flow from the feeder pump past the valve and to the hydraulic piston irrespective of the flow from the clutch pump; and
   wherein a pressure transducer is arranged in conjunction with the electrically controlled throttle or pressure valve.

* * * * *